United States Patent
DeGraaf

Patent Number: 5,878,368
Date of Patent: *Mar. 2, 1999

[54] NAVIGATION SYSTEM WITH USER DEFINABLE COST VALUES

[75] Inventor: Brent L. DeGraaf, Canton, Mich.

[73] Assignee: Magellan DIS, Inc., Rochester Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 713,627

[22] Filed: Sep. 13, 1996

[51] Int. Cl.$^6$ .................................................. G06G 7/78
[52] U.S. Cl. ..................... 701/209; 701/201; 701/210; 73/178 R; 340/990; 340/988
[58] Field of Search ................................. 701/200, 201, 701/202, 208, 209, 210, 212, 215, 216, 213, 211, 25, 26; 340/988, 990, 995; 73/178 R

[56] References Cited

U.S. PATENT DOCUMENTS

| | | | |
|---|---|---|---|
| 4,086,632 | 4/1978 | Lions | 701/210 |
| 5,031,104 | 7/1991 | Ikeda et al. | 701/209 |
| 5,220,507 | 6/1993 | Kirson | 701/202 |
| 5,289,195 | 2/1994 | Inoue | 701/208 |
| 5,311,173 | 5/1994 | Komura et al. | 701/208 |
| 5,369,588 | 11/1994 | Hayami et al. | 701/209 |
| 5,371,678 | 12/1994 | Nomura | 701/210 |
| 5,406,490 | 4/1995 | Braegas | 701/209 |
| 5,428,545 | 6/1995 | Maegawa et al. | 701/201 |
| 5,465,088 | 11/1995 | Braegas | 340/905 |
| 5,475,387 | 12/1995 | Matsumoto | 701/25 |
| 5,513,110 | 4/1996 | Fujiita et al. | 701/207 |
| 5,521,826 | 5/1996 | Matsumoto | 701/208 |
| 5,568,390 | 10/1996 | Hirota et al. | 701/209 |
| 5,612,882 | 3/1997 | LeFebvre et al. | 701/209 |
| 5,638,280 | 6/1997 | Nishimura et al. | 701/209 |
| 5,684,704 | 11/1997 | Okazaki | 701/201 |
| 5,712,788 | 1/1998 | Liaw et al. | 701/209 |
| 5,717,593 | 2/1998 | Gvili | 701/207 |
| 5,729,458 | 3/1998 | Poppen | 701/25 |
| 5,731,978 | 3/1998 | Tamai et al. | 701/201 |

*Primary Examiner*—Jacques H. Louis-Jacques
*Attorney, Agent, or Firm*—Howard & Howard

[57] ABSTRACT

A navigation system permits the user to designate certain roads or areas to avoid when planning a route. The navigation system generally includes a database of road segments and a cost associated with the road segments, such as estimated time of travel across that road segment and estimated length of travel across that road segment. The navigation system determines a route from a selected beginning point to a desired destination by evaluating the cost of the road segments to be traveled in several potential routes and recommends the potential route having the lowest total cost. The user can selectively modify the cost of selected road segments to indicate a preference or avoidance of such roads. By increasing the cost of a road segment, the navigation system is less likely to recommend a potential route which includes that road segment. Similarly, by decreasing the cost of a selected road segment, the navigation system is more likely to recommend a potential route which includes that road segment.

26 Claims, 3 Drawing Sheets

NAVIGATION SYSTEM WITH USER DEFINABLE COST VALUES

BACKGROUND OF THE INVENTION

This invention generally relates to navigation or route guidance systems that can be tailored to a user's particular wishes.

Navigation systems generally provide a recommended route from a starting point to a desired destination. Generally the starting point and desired destination are selected from a large database of roads stored in a mass media storage, such as a CD ROM, which includes the roads in the area to be traveled by the user. The navigation system can be located in a personal computer or can be installed in a vehicle. If the navigation system is installed in a vehicle, the starting point is typically the current position of the vehicle, which can be input from an associated positioning determining device, such as a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. The navigation system selects a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and turn-by-turn instructions to the driver, guiding the driver to the selected destination.

Some drivers prefer to avoid certain roads that they believe to be congested or certain areas that they believe to be unsafe. Some drivers may have a preference or aversion for particular types of roads such as highways or toll roads. Further, a route which is the shortest distance is sometimes preferred, while a route which is the lowest total time of travel is preferred at other times.

Current navigation systems have several limitations in how they select a potential route as the recommended route. The known navigation systems permit the driver to select one of the following preferences: fastest route; shortest route; use highways; avoid highways. However, the known systems do not permit the driver to adjust a weighting factor to be given to these preferences; nor can the driver adjust a balance between the fastest and shortest routes. Further, the known navigation systems do not permit the user to designate selected areas or roads to avoid or to adjust a preference/aversion factor of the road or area.

SUMMARY OF THE INVENTION

The present invention provides a navigation system which permits the user to modify the cost of roads when planning a route. The navigation system generally includes a database of roads to be traveled by a user. Each road in the database includes a "cost" for each road segment, such as estimated time of travel across that road segment and estimated length of travel across that road segment. A beginning point relative to the database of roads is input from a position determining device, such as a GPS system, or is input by the user, utilizing a mouse, keyboard or joystick. The user then selects a desired destination relative to the database of roads. The user selectively adjusts the cost for selected road segments or groups of road segments. When the navigation system determines a route from the selected beginning point to the desired destination, the navigation system evaluates the cost of the road segments to be traveled in several potential routes and recommends the potential route having the lowest total cost.

Because the user can selectively modify the cost of selected road segments, the user can indicate a preference or avoidance of such roads which will be considered by the navigation system when planning a route. For example, if the cost of a road segment is increased, the navigation system is less likely to recommend a potential route which includes that road segment. Similarly, if the cost of a selected road segment is decreased, the navigation system is more likely to recommend a potential route which includes that road segment.

Adjusting the cost of selected road segments can have many potential applications. First, by increasing the cost of certain road segments selected by the user, the user can indicate the road segments that the user desires to avoid, because the user believes these road segments to be congested or in an unsafe area. Alternatively, the navigation system can include a data receiving device which receives information regarding congested road segments and automatically updates congestion level values associated with each road segment.

By categorizing each road segment into a road type, such as highway, toll road, etc., the user can modify the cost of selected types of roads, thereby indicating a preference for highways or toll roads or an aversion to highways or toll roads. Further, by modifying the estimated time of travel of road segments differently than the estimated length of travel of road segments, the user can adjust the preference for a route having a low estimated time of travel or a low estimated distance of travel.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
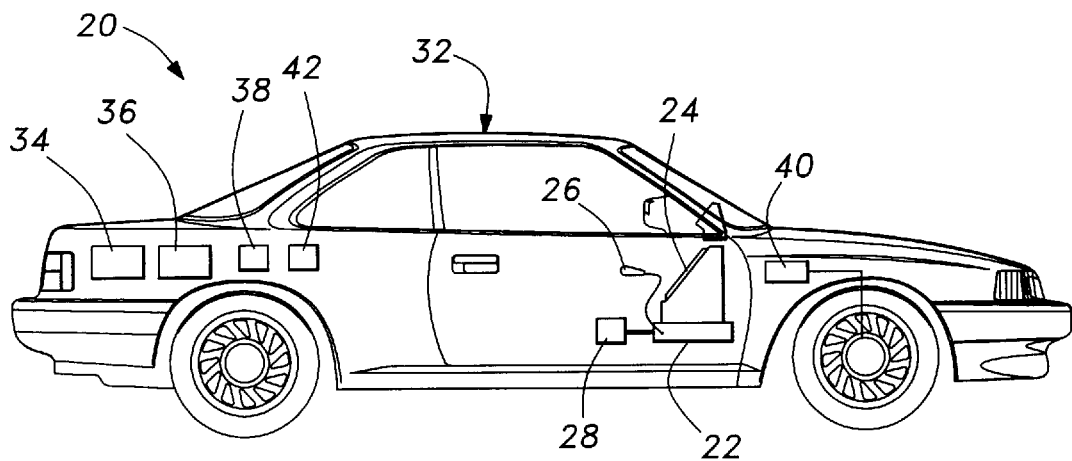
FIG. 1 is a schematic of the navigation system of the present invention installed in a vehicle having a position determining device.

The navigation system 20 of the present invention is shown schematically in FIG. 1. The navigation system 20 includes a CPU 22 connected to a display 24, such as a high resolution LCD or flat panel display. The CPU 22 is also connected to an input device 26, such as a mouse or keyboard. Alternatively, the display 24 can be a touch screen display. The navigation system 20 further includes a database 28 connected to the CPU 22. The database 28 is a mass media storage device, such as a CD ROM which includes a map of all of the roads in the area to be traveled by the user. Each road in the database is divided into road segments, each having an associated set of cost values, which indicate the "cost" of traveling that road segment. For example, the cost values include the length of the road segment, the estimated time to travel the road segment, the type of road (i.e. highway, secondary road, toll road, one way, etc.), and congestion level.

The navigation system 20 can, but need not, be installed in a vehicle 32. The navigation system 20 can be used in conjunction with position-determining devices, such as a GPS system 34, a gyroscope 36, a compass 38, and a wheel speed sensor 40, all connected to the CPU 22 [connections not shown for simplicity]. Such position determining devices are well known and are commercially available. Preferably, a combination of these position determining devices is utilized. The navigation system 20 further includes a data receiver 42, such as a radio receiver for receiving up-to-date broadcast information regarding the congestion levels of area road segments. Congestion-monitoring devices are known and currently used to automatically monitor the congestion levels of certain road segments, typically near intersections. Preferably, information regarding congestion from the congestion-monitoring devices is broadcast to the surrounding area and received by the data receiver 42. The data receiver 42 sends the congestion information to the CPU 22, which stores the updated congestion information. Alternatively, many radio stations broadcast information regarding the congestion levels of area road segments. This congestion information can be added manually by the user to the CPU 22.

Figure 2:
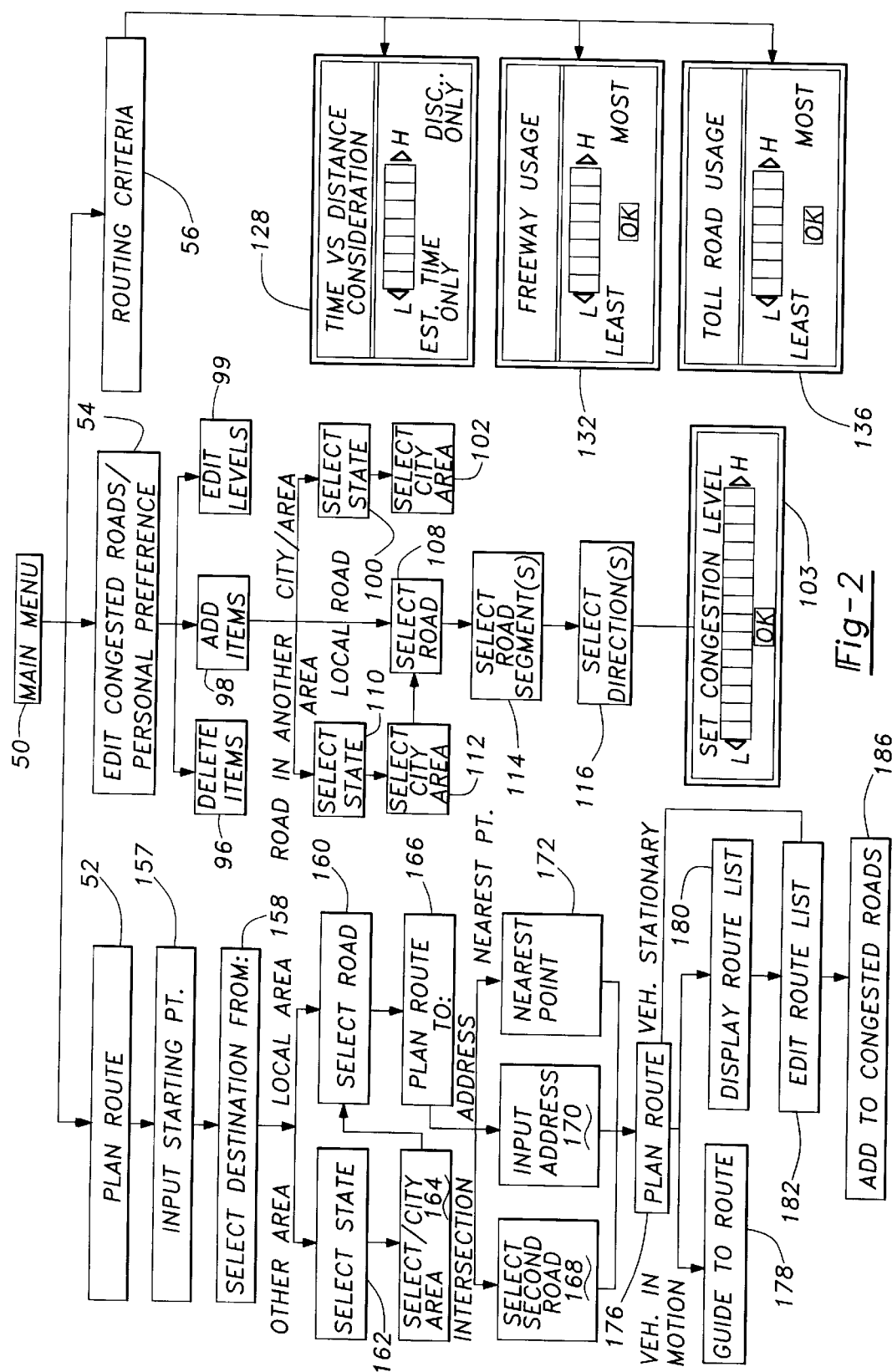
FIG. 2 is a flow chart of the navigation system of FIG. 1.

The operation of the navigation system 20 is shown in FIG. 2. For purposes of illustration, the navigation system 20 of the present invention will be described as installed in a vehicle 32 having position determining devices. At power-up, the navigation system 20 preferably begins in the main menu 50, which informs the user that he may elect to plan a route 52, edit congested roads 54, or edit routing criteria 56.

By selecting to edit congested roads in step 54, the user can delete items from the congested road list in step 96, add items to the congested road list in step 98, or edit the congestion levels in step 99. If the user elects to add items in step 98, the display 24 prompts the user to select a road segment from a local area, a road segment in another area, or all road segments in an area. Utilizing the mouse 26, if the user wishes to add all road segments in an area to the congested road list, the user selects a state in step 100 and a city or area in step 102. The user then sets the congestion level in step 103. Preferably, the congestion level is selected from at least 3 levels and most preferably 14 levels. Preferably, the lowest congestion level assigns a congestion value of 1.0, signifying no known congestion. Level 14, the highest level, would assign a congestion level on the order of 10,000, indicating an almost absolute avoidance, unless there is no alternate route, such as if the destination or beginning point is located on that road segment. Preferably, the congestion value for each level increases approximately by a factor of 1.7, such that the congestion value is assigned by level 2 is 1.7, level 3 is 2.89, level 4 is 4.9 and level 5 is 8.35, etc.

If the user elects to add a road segment in the immediate area surrounding the present vehicle location, the user selects a road in step 108 by entering the first few letters of the road name and then selecting the road from an alphabetized list. If the user elects to add a road in another area, the user must first select a state in step 110 and a city or area in step 112.

After selecting a road in step 108, the user selects a particular road segment or segments in step 114 such that the congested area includes a road segment between selected exits, a single exit, a single intersection, the entire road within a city, the entire road within an area, etc. If the user has not selected a road segment which is a one way street, the user can select to edit the congestion level in a single direction or in both directions in step 116. The congestion level is then set in step 103.

If the user elects to delete items from the congested road list in step 96, a list of all roads, cities, areas, or road segments for which a congestion level has been set, is displayed. Utilizing the mouse 26, the user selects an item or items to be deleted from the congested road list. The user can utilize this adjustment to select or not select roads, geographic areas, etc. that the user wishes to avoid or use for purely personal reasons. The display at step 96 may include the legend "Edit Personal Preference", or a separate election can be add to the system for personal preference. The user would increase the congestion value for an area or road that he wishes to avoid. Also, the system could include a display or "Personal Preference" that can be adjusted and then used similarly to the congestion value.

The user can also elect to edit the congestion levels in step 99, in which case the entire list of roads, road segments, cities, and areas is displayed. The user selects an item from the list utilizing the mouse 26, and sets the congestion level for that item in step 103.

If the user elects to edit the routing criteria 56 from the main menu 50, the user can modify the time/distance factor in step 128 utilizing the mouse 26. Preferably, the user selects one of at least 7 levels for the time/distance factor. The time/distance factor is a value to be multiplied by an estimated time of travel to weight it for comparison against an estimated length of travel. The lowest level, level 1, would preferably have a time/distance factor of zero miles per hour, indicating an absolute preference for the route having the lowest estimated time of travel, rather than shortest length of travel. The highest level, level 7, would preferably have a time/distance factor of 1000 miles per hour, indicating an almost absolute preference for the lowest length of travel route, rather than the lowest estimated time of travel route. The middle level, level 4, would preferably have a time/distance factor of 45 miles per hour, indicating a medium preference between the route having the lowest estimated time of travel and the road having the lowest estimated length of travel. The other levels would have intermediate time/distance factors.

From the routing criteria menu 56, the user can elect to modify the highway preference/avoidance factor in step 132. The highway preference/avoidance factor multiplies the cost of any highways in potential routes. Preferably, the display 24 displays at least 7 levels to the user, which can be selected using the mouse 26. The middle level, level 4, would have a highway preference/avoidance factor of 1.0, indicating no preference or avoidance of highways. Level 1, avoidance, would preferably have a highway preference/avoidance factor of 1000, indicating an almost absolute total avoidance of highways. Level 7, preference, would preferably have a highway preference/avoidance factor of 0.2, indicating a preference for highways, by effectively decreasing the cost of highways by a factor of 5. Preferably, the navigation system 20 further includes the data receiver 42 which receives information regarding congested road segments in the surrounding area and sends the congestion information to the CPU 22, where the congestion levels of the appropriate road segments are updated. Alternatively, or in addition, the data receiver 42 can be a standard radio which receives local broadcasts regarding the congestion levels of area road segments, in which case the user could manually update the congestion levels for the appropriate road segments.

From the routing criteria menu 56, the user can also elect to modify the toll roads preference/avoidance factor in step 136. Preferably, the display 24 displays to the user at least 7 levels for the toll road preference/avoidance factor, which can be selected utilizing the mouse 26. The middle level, level 4, would have a toll road preference/avoidance factor of 1.0, indicating no preference or avoidance of toll roads. Level 1, avoidance, would preferably have a toll road/ avoidance factor of 10, indicating an avoidance of toll roads so long as the cost is otherwise increased by less than a factor of 10. Level 7, preference, would preferably have a toll road preference/avoidance factor of 0.2, indicating a preference for toll roads so long as the cost is not otherwise increased by a factor of 5. The remaining levels would have appropriately scaled intermediate factors.

If the user elects to plan a route 52, the navigation system 20 inputs a starting point relative to the database 28 in step 157. If the navigation system 20 includes a position determining devices, the current position of the vehicle 32 is input as the starting point for the route to be planned. Otherwise the user selects a starting point utilizing the display 24 and mouse 26. Preferably the user types in the first few letters of the name of the road and then selects the starting point road from a list of roads. The user then selects an intersection or address as a beginning point.

The navigation system 20 then inputs the destination. In step 158, the user selects a destination from the local area surrounding the current vehicle position or from all areas. If the user wishes to select a destination from a local area, the user selects a road as the destination to which the route will be guided in step 160. Otherwise the user must first select a state in step 162 and a city or area in step 164. In step 166, the navigation system 20 requests whether to plan the route to a specific intersection of the selected road in step 168, a specific address on the selected road in step 170 or the nearest point on the selected road in step 172.

In step 176, the navigation system 20 plans a route from the starting point to the selected destination utilizing the roads in the database 28. The navigation system 20 evaluates the total cost of a plurality of potential routes between the starting point and selected destination. The navigation system 20 selects the potential route from the starting point to the selected destination which has the lowest total cost as modified by the user in the Route Planning routine 176, described more fully below.

Figure 3:
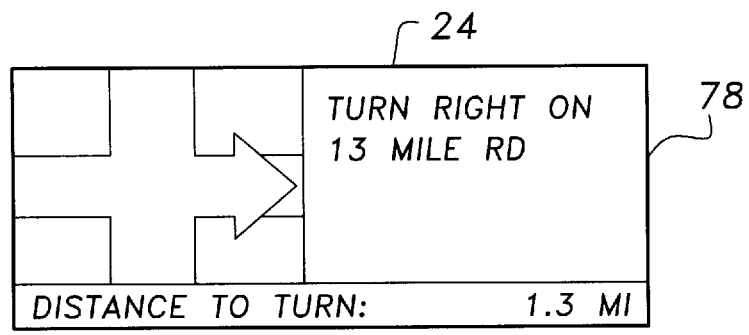
FIG. 3 is a screen of the display of the navigation system of FIG. 1 illustrating a route guidance instruction.

If the vehicle 32 is moving when the route planning routine 176 is completed, the display 24 of the navigation system 20 displays route guidance information in step 178. Preferably, the navigation system 20 displays "turn-by-turn" information to the driver, i.e., the display 24 displays a map of the immediate area showing the present position of the vehicle and the next maneuver in the recommended route. If the vehicle 32 is stationary at the time the route planning routine 176 is complete, the display 24 preferably displays a list of the road segments in the recommended route in step 180. As the user scrolls up and down through the road segments in the recommended route list, a graphical image of the recommended maneuver (i.e., turn right or turn left) is displayed adjacent the route list. In step 182, the user can edit the route list by selecting one of the segments in the recommended route list. In step 186, the user adds the selected road segment from the recommended route list to the congested roads list. In step 190, the user sets the congestion level for the selected road segment. Preferably, if the item was not previously on a congested road list, the congestion value is set to 1.7. If the road segment was already on the congested road list, the congestion value is multiplied by 1.7 in step 190. If the user edits the route list, the navigation system 20 must replan the route in step 176, utilizing the new cost values. If the vehicle 32 is moving, the navigation system 20 will then proceed to step 178, where the display 24 will display turn-by-turn route guidance instructions to the driver. As shown in FIG. 3 the display 24 preferably displays a map of the immediate area showing the present position of the vehicle and the next maneuver in the recommended route.

Figure 4:
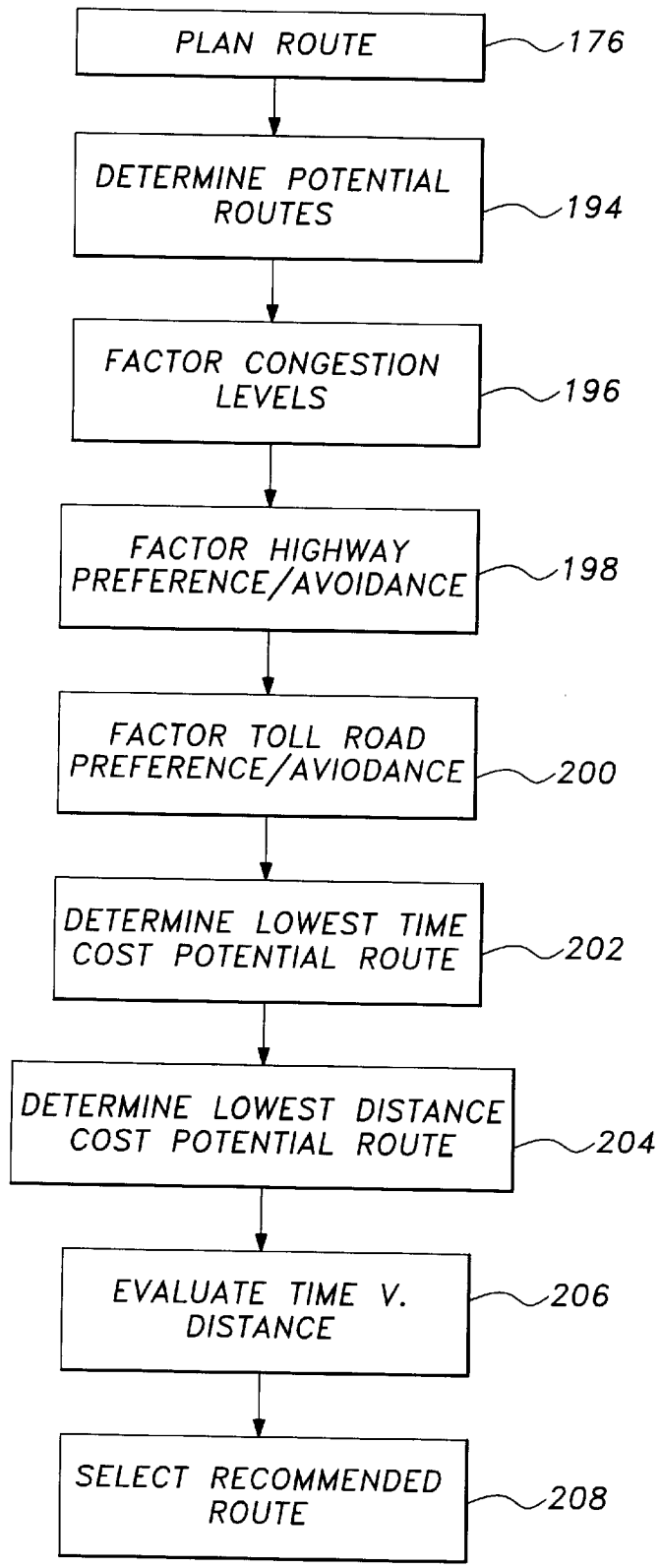
FIG. 4 is a flow chart of the Route Planning routine in FIG. 2.

The Route Planning routine 176 is shown in detail in FIG. 4. First, the CPU 22 determines potential routes from the beginning point to the desired destination in the road database 28 in step 194. In step 196, the CPU 22 multiplies the cost of each road segment by the congestion level for that road segment if the congestion level has been set. For example, if one of the road segments in one of the potential routes from the starting point to the selected destination includes a congestion value of 1.7, the length and estimated time of travel for that road segment are multiplied by 1.7.

In step 198, the CPU 22 multiplies the cost of each road segment which is a highway by the highway preference/ avoidance factor. If the user has defined a preference/ avoidance value for highways, the cost (time and length) of the highway road segments in the potential routes are multiplied by the highway preference/avoidance value. If highways are preferred, the highway preference/avoidance value is less than 1, thereby reducing the length and estimated time of travel for purposes of estimating the "cost" of travelling highways. If the highway preference/avoidance value is greater than 1, the length and estimated time of travel of highway road segments will be increased, thereby increasing the "cost" of highway road segments.

In step 200, the CPU 22 multiplies the cost of any potential road segments which are toll roads by the toll road preference/avoidance factor. Again, a value less than one would reduce the effective cost of travelling toll roads, thereby indicating a preference for toll roads. A value greater than one would increase the effective cost of toll roads, thereby indicating an aversion to toll roads.

In step 202, the CPU 22 selects the potential route which has the lowest total time cost, after factoring in the aforementioned user preferences. Similarly, in step 204, the CPU 22 selects the potential route which has the lowest distance cost, after factoring in the afore-mentioned user preferences.

In step 206, the CPU 22 compares the lowest time cost potential route with the lowest distance cost potential route. The time cost of the lowest time cost route is multiplied by the time/distance factor to convert it to a distance to be compared to the distance cost in the lowest distance cost potential route.

In step 208, the CPU 22 selects the route with the lower distance cost, after converting the time of the lowest time cost route to distance utilizing the time/distance factor. For example, at level 1, the time/distance factor would be set to zero, in which case the lowest time cost potential route would always be selected over the lowest distance cost route. At level 4, each hour in the lowest time cost route would be converted to 45 miles, indicating a medium balance between the shortest route and the quickest route. At level 7, each hour in the lowest time cost route would be converted to 1000 miles, which would effectively ensure that the lowest distance route would have a lower cost than the lowest time cost route, indicating a strong preference for the shortest route rather than the quickest route.

Preferably, the settings selected by the user are stored and are utilized when the user plans the next route to a new destination. Optionally, the navigation system 20 can reset the congestion levels, highway preference/avoidance, toll road preference/avoidance and time v cost factor when the navigation system 20 is turned off, or when the destination is reached.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A navigation system comprising:
    a database of road segments to be travelled by a user, said database including a cost associated with each said road segment;
    a system for selecting a beginning point relative to said database of roads;
    a user input device for selecting a desired destination relative to said database of roads, said user input device manually selecting at least one of said road segments and adjusting said cost of said at least one selected road segment; and
    a system for determining a route from said database of roads between said beginning point and said desired destination based upon said adjusted cost of said selected at least one road segment.

2. The navigation system of claim 1 wherein said user input device enters the first few letters of said selected road segment, said user input device selecting said selected road segment from a list of road segments including said first few letters.

3. The navigation system of claim 1 wherein said user input device selects a city and adjusts the cost for a plurality of road segments in said selected city.

4. The navigation system of claim 1 wherein said user input device selects from at least three values in order to adjust said cost of said at least one selected road segment.

5. The navigation system of claim 1 wherein said system for adjusting said cost includes a system for receiving congestion information, said congestion information including identification of a congested area.

6. The navigation system of claim 1 wherein said user input device selects a road segment to avoid, said system for adjusting said cost increasing the cost for said selected road segment to avoid.

7. The navigation system of claim 1 wherein said system for determining a route recommends a plurality of recommended road segments in said route, said user input device selecting at least one, but not all, of said plurality of recommended road segments, said user input device selectively editing the cost of said selected at least one of said recommended road segments, said system for determining a route determining a second route including said plurality of recommended road segments other than said selected at least one road segment.

8. The navigation system of claim 1 further including a memory storing each selected road segment for which the cost has been adjusted and the associated adjusted cost of said selected road segment, wherein said beginning point is a first beginning point, said destination is a first destination and said route is a first route, said system for determining a route determining a second route from said database of roads between a second beginning point different from said first beginning point and a second desired destination based upon said adjusted cost of each said selected road segment as stored in said memory.

9. The navigation system of claim 8 wherein each said selected road segment and its associated adjusted cost is further associated with a user.

10. The navigation system of claim 1 wherein said road segments each have an associated road type, said user input device selecting a road type and adjusting the cost for all road segments of said selected type.

11. The navigation system of claim 10 wherein said road type includes freeways.

12. The navigation system of claim 1 wherein said user input device selects between decreasing and increasing the cost of said selected road segment.

13. A navigation system comprising:
    a database of road segments to be travelled by a user, said database including a cost associated with each said road segment, said road segments each having a time cost and a distance cost;
    a system for selecting a beginning point relative to said database of roads;
    a user input device for selecting a desired destination relative to said database of roads;
    a system for adjusting said cost of at least one selected road segment of said plurality of road segments utilizing said user-input device; and
    a system for determining a route from said database of roads between said beginning point and said desired destination based upon said adjusted cost of said selected road segment, said system for determining a route comparing the time cost of a first road segment with a distance cost of a second road segment and recommending a route based upon a time/distance weighting factor, said user input device adjusting said time/distance weighting factor.

14. The navigation system of claim 13 wherein said road segments each have an associated road type, said system for adjusting said cost adjusting the cost for all road segments of a selected type.

15. A method for planning a route including the steps of:
    a) selecting a beginning point relative to a database of roads;
    b) selecting a destination relative to said database of roads;
    c) manually selecting a road segment from said database of roads;
    d) adjusting a cost associated with said selected road segment; and
    e) determining a route from said database of roads from said beginning point to said destination based upon said adjusted cost of said selected road segment.

16. The method for planning a route according to claim 15 wherein said step c) further includes the steps of:
    entering the first few letters of the name of said selected road segment;

selecting said road segment from a list of road segments having said first few letters.

17. The method for planning a route according to claim 15 further including the steps of:

associating an estimated time of travel with said road segment;

associating a length of travel with said road segment; and adjusting the cost of a road segment proportionally to its estimated time of travel or estimated length of travel.

18. The method for planning a route according to claim 15 further including the steps of:

selecting a time/distance factor for evaluating the cost of potential routes between said beginning point and said desired destination;

selectively adjusting said time/distance factor; and determining a route from said database of roads from said beginning point to said desired destination based upon said time/distance factor, said estimated time of travel and said length of travel.

19. The method for planning a route according to claim 15 further including the steps of:

determining a present position relative to said database of roads; and selecting said present position relative to said database of roads as said beginning point.

20. The method for planning a route according to claim 15 further including the steps of:

displaying a list of road segments for which the cost has been adjusted;

selecting said selected road segment from said list of road segments; and adjusting the cost of said selected road segment.

21. The method for planning a route according to claim 15 wherein said step d) includes the step of decreasing the cost of said selected road segment.

22. The method for planning a route according to claim 15 wherein said step d) includes the step of selecting between increasing or decreasing the cost of said selected road segment.

23. A method for planning a route including the steps of:

a) selecting a beginning point relative to a database of roads;

b) selecting a destination relative to said database of roads;

c) adjusting a cost associated with a selected road segment in said database of roads; and d) selecting a time/distance factor for evaluating the cost of potential routes between said beginning point and said desired destination;

e) comparing the estimated time of travel of a first potential route with the length of travel of a second potential route utilizing said time/distance factor;

f) determining a route from said database of roads from said beginning point to said desired destination based upon said time/distance factor, said estimated time of travel and said length of travel.

24. A method for planning a route including the steps of:

a) selecting a beginning point relative to a database of roads;

b) selecting a destination relative to said database of roads;

c) selecting a road segment to avoid;

d) increasing the cost of said road segment;

e) comparing said increased cost for said road segment to avoid with a cost of an alternative route not including said road segment; and f) determining a route from said database of roads from said beginning point to said destination based upon said increased cost.

25. The method for planning a route according to claim 24 further including the steps of:

displaying a first route comprising a plurality of road segments from said beginning point to said destination;

selecting one of said plurality of road segments as a road segment to avoid; and determining a second route to said destination from said position of said vehicle, said second route not including said road segment to avoid.

26. A method for planning a route including the steps of:

a) selecting a beginning point relative to a database of roads, said database of roads having a plurality of road segments;

b) selecting a destination relative to said database of roads;

c) associating a time cost with each said road segment;

d) associating a distance cost with each said road segment;

e) selecting a first time/distance factor;

f) selecting a first recommended route from said beginning point to said destination based upon said time cost of said road segments, said distance cost of said road segments and said first time/distance factor;

g) changing said first time/distance factor after said step f) to a second time/distance factor; and h) selecting a second recommended route from said beginning point to said destination based upon said time cost of said road segments, said distance cost of said road segments and said second time/distance factor, said second recommended route including at least one road segment not included in said first recommended route.

\* \* \* \* \*

(12) EX PARTE REEXAMINATION CERTIFICATE (10273rd)
United States Patent
DeGraaf

(10) Number: US 5,878,368 C1
(45) Certificate Issued: Aug. 27, 2014

(54) NAVIGATION SYSTEM WITH USER DEFINABLE COST VALUES

(75) Inventor: Brent L. DeGraaf, Canton, MI (US)

(73) Assignee: Beacon Navigation GmbH, Zug (CH)

Reexamination Request:
No. 90/012,269, Apr. 26, 2012

Reexamination Certificate for:
Patent No.: 5,878,368
Issued: Mar. 2, 1999
Appl. No.: 08/713,627
Filed: Sep. 13, 1996

(51) Int. Cl.
*G01C 21/34* (2006.01)
*G08G 1/0968* (2006.01)

(52) U.S. Cl.
USPC ........... 701/411; 340/988; 340/990; 701/425; 701/533; 73/178 R

(58) Field of Classification Search
None
See application file for complete search history.

(56) References Cited

To view the complete listing of prior art documents cited during the proceeding for Reexamination Control Number 90/012,269, please refer to the USPTO's public Patent Application Information Retrieval (PAIR) system under the Display References tab.

*Primary Examiner* — Simon Ke

(57) ABSTRACT

A navigation system permits the user to designate certain roads or areas to avoid when planning a route. The navigation system generally includes a database of road segments and a cost associated with the road segments, such as estimated time of travel across that road segment and estimated length of travel across that road segment. The navigation system determines a route from a selected beginning point to a desired destination by evaluating the cost of the road segments to be traveled in several potential routes and recommends the potential route having the lowest total cost. The user can selectively modify the cost of selected road segments to indicate a preference or avoidance of such roads. By increasing the cost of a road segment, the navigation system is less likely to recommend a potential route which includes that road segment. Similarly, by decreasing the cost of a selected road segment, the navigation system is more likely to recommend a potential route which includes that road segment.

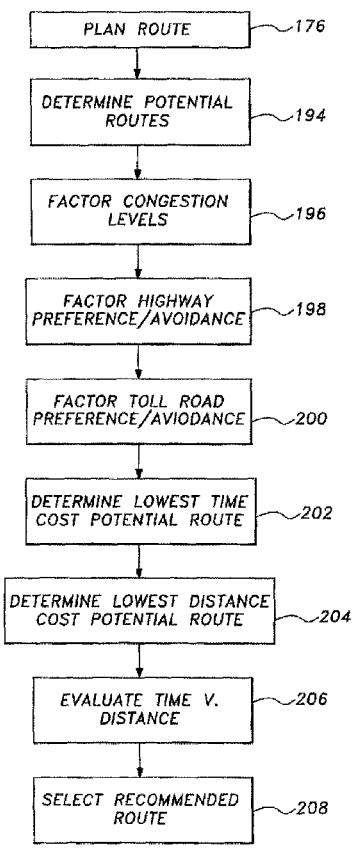

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 15 are cancelled.

Claims 2-14 and 16-26 were not reexamined.

\* \* \* \* \*

US005878368C2

(12) EX PARTE REEXAMINATION CERTIFICATE (10854th)
United States Patent
DeGraaf

(10) Number: US 5,878,368 C2
(45) Certificate Issued: Apr. 22, 2016

(54) NAVIGATION SYSTEM WITH USER DEFINABLE COST VALUES

(75) Inventor: Brent L. DeGraaf, Canton, MI (US)

(73) Assignee: BEACON NAVIGATION GMBH

Reexamination Request:
No. 90/020,083, Apr. 13, 2015

Reexamination Certificate for:
Patent No.: 5,878,368
Issued: Mar. 2, 1999
Appl. No.: 08/713,627
Filed: Sep. 13, 1996

Reexamination Certificate C1 5,878,368 issued Aug. 27, 2014

(51) Int. Cl.
G08G 1/0968 (2006.01)
(52) U.S. Cl.
CPC .................. G08G 1/096827 (2013.01)
(58) Field of Classification Search
CPC ............................... G08G 1/096827
USPC ........................................ 701/411
See application file for complete search history.

(56) References Cited

To view the complete listing of prior art documents cited during the proceeding for Reexamination Control Number 90/020,083, please refer to the USPTO's public Patent Application Information Retrieval (PAIR) system under the Display References tab.

Primary Examiner — Michelle Tarae

(57) ABSTRACT

A navigation system permits the user to designate certain roads or areas to avoid when planning a route. The navigation system generally includes a database of road segments and a cost associated with the road segments, such as estimated time of travel across that road segment and estimated length of travel across that road segment. The navigation system determines a route from a selected beginning point to a desired destination by evaluating the cost of the road segments to be traveled in several potential routes and recommends the potential route having the lowest total cost. The user can selectively modify the cost of selected road segments to indicate a preference or avoidance of such roads. By increasing the cost of a road segment, the navigation system is less likely to recommend a potential route which includes that road segment. Similarly, by decreasing the cost of a selected road segment, the navigation system is more likely to recommend a potential route which includes that road segment.

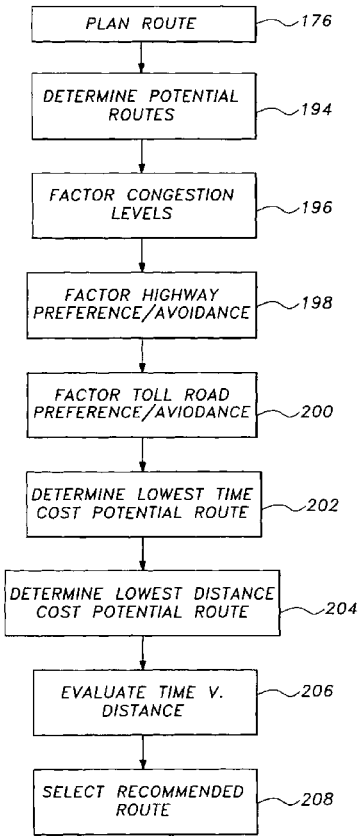

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1 and 15 were previously cancelled.
Claims 10 and 11 are cancelled.
Claims 2-9, 12-14 and 16-26 were not reexamined.

\* \* \* \* \*